United States Patent
Cheng et al.

(10) Patent No.: US 10,891,526 B2
(45) Date of Patent: Jan. 12, 2021

(54) FUNCTIONAL IMAGE ARCHIVING

(71) Applicant: Google LLC, Mountain View, CA (US)

(72) Inventors: Shinko Cheng, Cuperino, CA (US); Eunyoung Kim, Mountain View, CA (US); Shengyang Dai, Dublin, CA (US); Madhur Khandelwal, San Jose, CA (US); Kristina Eng, Fremont, CA (US); David Loxton, Mountain View, CA (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 16/230,788

(22) Filed: Dec. 21, 2018

(65) Prior Publication Data

US 2019/0197364 A1 Jun. 27, 2019

Related U.S. Application Data

(60) Provisional application No. 62/609,522, filed on Dec. 22, 2017.

(51) Int. Cl.
*G06K 9/62* (2006.01)
*G06F 16/51* (2019.01)
*G06F 16/11* (2019.01)

(52) U.S. Cl.
CPC .......... *G06K 9/6284* (2013.01); *G06F 16/113* (2019.01); *G06F 16/51* (2019.01)

(58) Field of Classification Search
CPC ...... G06K 9/6284; G06F 16/51; G06F 16/113
See application file for complete search history.

(56) References Cited

U.S. PATENT DOCUMENTS 6,883,140 B1 * 4/2005 Acker ................. G06F 3/04845
715/722
8,266,109 B1 9/2012 Bilsborough
(Continued)

FOREIGN PATENT DOCUMENTS

CN 1475908 2/2004
CN 102222079 10/2011
(Continued)

OTHER PUBLICATIONS

WIPO, International Preliminary Report on Patentability for International Patent Application No. PCT/US2018/021028, dated Nov. 28, 2019, 10 pages.
(Continued)

*Primary Examiner* — Wesley J Tucker
(74) *Attorney, Agent, or Firm* — IP Spring

(57) ABSTRACT

Some implementations related to archiving of functional images. In some implementations, a method includes accessing images and determining one or more functional labels corresponding to each of the images and one or more confidence scores corresponding to the functional labels. A functional image score is determined for each of the images based on the functional labels having a corresponding confidence score that meets a respective threshold for the functional labels. In response to determining that the functional image score meets a functional image score threshold, a functional image signal is provided that indicates that one or more of the images that meet the functional image score threshold are functional images. The functional images are determined to be archived, and are archived by associating an archive attribute with the functional images such that functional images having the archive attribute are excluded from display in views of the images.

20 Claims, 5 Drawing Sheets

(56) References Cited

U.S. PATENT DOCUMENTS

| | | |
|---|---|---|
| 8,391,618 B1 | 3/2013 | Chuang et al. |
| 8,423,577 B1 | 4/2013 | Lee et al. |
| 8,515,958 B2 | 8/2013 | Knight |
| 8,688,698 B1 | 4/2014 | Black et al. |
| 8,825,474 B1 | 9/2014 | Zhai et al. |
| 8,938,669 B1 | 1/2015 | Cohen |
| 8,996,639 B1 | 3/2015 | Faaborg et al. |
| 9,191,786 B2 | 11/2015 | Davis |
| 9,213,941 B2 | 12/2015 | Petersen |
| 9,230,241 B1 | 1/2016 | Singh et al. |
| 9,600,724 B2 | 3/2017 | Ko et al. |
| 9,674,120 B2 | 6/2017 | Davis |
| 9,715,496 B1 | 7/2017 | Sapoznik et al. |
| 9,805,371 B1 | 10/2017 | Sapoznik et al. |
| 9,807,037 B1 | 10/2017 | Sapoznik et al. |
| 9,817,813 B2 | 11/2017 | Faizakof et al. |
| 9,973,705 B2 | 5/2018 | Ko et al. |
| 10,404,636 B2 | 9/2019 | Rodriguez et al. |
| 10,412,030 B2 | 9/2019 | McGregor et al. |
| 10,440,279 B2 | 10/2019 | Ko et al. |
| 2003/0105589 A1 | 6/2003 | Liu et al. |
| 2005/0146621 A1 | 7/2005 | Tanaka et al. |
| 2006/0004685 A1 | 1/2006 | Pyhalammi et al. |
| 2006/0156209 A1 | 7/2006 | Matsuura et al. |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2009/0007019 A1 | 1/2009 | Kobayashi et al. |
| 2009/0076795 A1 | 3/2009 | Bangalore et al. |
| 2009/0282114 A1 | 11/2009 | Feng et al. |
| 2009/0313194 A1* | 12/2009 | Amar .................. G06F 16/353 706/20 |
| 2010/0118115 A1 | 5/2010 | Takahashi et al. |
| 2010/0260426 A1 | 10/2010 | Huang et al. |
| 2011/0074685 A1 | 3/2011 | Causey et al. |
| 2011/0091092 A1* | 4/2011 | Nepomniachtchi ........................ G06K 9/00463 382/139 |
| 2011/0098056 A1 | 4/2011 | Rhoads |
| 2011/0107223 A1 | 5/2011 | Tilton et al. |
| 2011/0145068 A1 | 6/2011 | King et al. |
| 2011/0164163 A1 | 7/2011 | Bilbrey et al. |
| 2011/0212717 A1* | 9/2011 | Rhoads ................. G06F 16/58 455/420 |
| 2011/0221912 A1 | 9/2011 | Yoshizawa |
| 2011/0230174 A1 | 9/2011 | Mandanapu et al. |
| 2011/0252108 A1 | 10/2011 | Morris et al. |
| 2011/0252207 A1 | 10/2011 | Janosik, Jr. et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lau et al. |
| 2012/0131520 A1 | 5/2012 | Tang et al. |
| 2012/0224743 A1 | 9/2012 | Rodriguez et al. |
| 2012/0245944 A1 | 9/2012 | Gruber et al. |
| 2012/0322428 A1 | 12/2012 | Lupoli et al. |
| 2013/0022231 A1* | 1/2013 | Nepomniachtchi .. G06K 9/3275 382/102 |
| 2013/0050507 A1 | 2/2013 | Syed et al. |
| 2013/0061148 A1 | 3/2013 | Das et al. |
| 2013/0073366 A1 | 3/2013 | Heath |
| 2013/0260727 A1 | 10/2013 | Knudson et al. |
| 2013/0346235 A1 | 12/2013 | Lam |
| 2014/0035846 A1 | 2/2014 | Lee et al. |
| 2014/0088954 A1 | 3/2014 | Shirzadi et al. |
| 2014/0129942 A1 | 5/2014 | Rathod |
| 2014/0163954 A1 | 6/2014 | Joshi et al. |
| 2014/0164506 A1 | 6/2014 | Tesch et al. |
| 2014/0189538 A1 | 7/2014 | Martens et al. |
| 2014/0201675 A1 | 7/2014 | Joo et al. |
| 2014/0232889 A1 | 8/2014 | King et al. |
| 2014/0237057 A1 | 8/2014 | Khodorenko |
| 2014/0317030 A1 | 10/2014 | Shen et al. |
| 2014/0341476 A1* | 11/2014 | Kulick .................... G06F 16/51 382/224 |
| 2014/0372349 A1 | 12/2014 | Driscoll |
| 2015/0006143 A1 | 1/2015 | Skiba et al. |
| 2015/0026642 A1 | 1/2015 | Wilson et al. |
| 2015/0032724 A1 | 1/2015 | Thirugnanasundaram et al. |
| 2015/0095855 A1 | 4/2015 | Bai et al. |
| 2015/0100537 A1 | 4/2015 | Grieves et al. |
| 2015/0178388 A1 | 6/2015 | Winnemoeller et al. |
| 2015/0185995 A1 | 7/2015 | Showmaker et al. |
| 2015/0207765 A1 | 7/2015 | Brantingham et al. |
| 2015/0220806 A1 | 8/2015 | Heller et al. |
| 2015/0227797 A1 | 8/2015 | Ko et al. |
| 2015/0248411 A1 | 9/2015 | Krinker et al. |
| 2015/0286371 A1 | 10/2015 | Degani |
| 2015/0302301 A1 | 10/2015 | Petersen |
| 2015/0370830 A1 | 12/2015 | Murphy-Chutorian et al. |
| 2016/0011725 A1 | 1/2016 | D'Argenio et al. |
| 2016/0042252 A1 | 2/2016 | Sawhney et al. |
| 2016/0043817 A1 | 2/2016 | Handoush et al. |
| 2016/0055246 A1 | 2/2016 | Marcin et al. |
| 2016/0092044 A1 | 3/2016 | Laska et al. |
| 2016/0140447 A1 | 5/2016 | Cohen et al. |
| 2016/0162791 A1 | 6/2016 | Petersen |
| 2016/0179816 A1 | 6/2016 | Glover |
| 2016/0196040 A1 | 7/2016 | Kapadia et al. |
| 2016/0210279 A1 | 7/2016 | Kim et al. |
| 2016/0283454 A1 | 9/2016 | Leydon et al. |
| 2016/0321052 A1 | 11/2016 | Sharifi et al. |
| 2016/0342895 A1 | 11/2016 | Gao et al. |
| 2016/0350304 A1 | 12/2016 | Aggarwal et al. |
| 2017/0017648 A1 | 1/2017 | Pearlman et al. |
| 2017/0031575 A1 | 2/2017 | Dotan-Cohen et al. |
| 2017/0075878 A1 | 3/2017 | Jon et al. |
| 2017/0098122 A1 | 4/2017 | el Kaliouby et al. |
| 2017/0134316 A1 | 5/2017 | Cohen et al. |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0293834 A1 | 10/2017 | Raison et al. |
| 2017/0344224 A1 | 11/2017 | Kay et al. |
| 2018/0004397 A1 | 1/2018 | Stefano |
| 2018/0005272 A1 | 1/2018 | Todasco et al. |
| 2018/0012231 A1 | 1/2018 | Sapoznik et al. |
| 2018/0013699 A1 | 1/2018 | Sapoznik et al. |
| 2018/0227498 A1 | 8/2018 | Ko et al. |
| 2018/0336226 A1 | 11/2018 | Anorga et al. |
| 2018/0336415 A1* | 11/2018 | Anorga .............. G06K 9/00671 |

FOREIGN PATENT DOCUMENTS

| | | |
|---|---|---|
| CN | 102395966 | 3/2012 |
| CN | 102467574 | 5/2012 |
| CN | 103548025 | 1/2014 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| WO | 2004/104758 | 12/2004 |
| WO | 2011/002989 | 1/2011 |
| WO | 2016130788 | 8/2016 |
| WO | 2018089109 | 5/2018 |

OTHER PUBLICATIONS

USPTO, First Action Interview, Pre-Interview Communication for U.S. Appl. No. 15/912,796, dated Jan. 8, 2020, 5 pages.
USPTO, First Action Interview, Pre-Interview Communication for U.S. Appl. No. 15/912,809, dated Nov. 22, 2019, 5 pages.
USPTO, Final Office Action for U.S. Appl. No. 15/912,809, dated Jun. 24, 2020, 8 pages.
USPTO, Notice of Allowance for U.S. Appl. No. 15/912,809, dated Sep. 11, 2020, 12 pages.

(56) References Cited

OTHER PUBLICATIONS

USPTO, Notice of Allowance for U.S. Appl. No. 15/912,796, dated Aug. 20, 2020, 9 pages.
USPTO, First Action Interview, Office Action Summary for U.S. Appl. No. 15/912,809, dated Feb. 18, 2020, 18 pages.
USPTO, Notice of Allowance for U.S. Appl. No. 16/569,273, dated Feb. 20, 2020, 17 pages.
USPTO, First Action Interview, Office Action Summary for U.S. Appl. No. 15/912,796, dated Mar. 13, 2020, 5 pages.
USPTO, Non-final Office Action for U.S. Appl. No. 16/569,273, dated Oct. 18, 2019, 21 pages.
EPO, Written Opinion of the International Preliminary Examining Authority for International Patent Application No. PCT/US2018/021028, dated Jun. 14, 2019, 11 pages.
Chen, et al., "A Survey of Document Image Classification: problem statement, classifier architecture and performance evaluation," International Journal of Document Analysis and Recognition (IJDAR), vol. 10, No. 1, Aug. 3, 2006, pp. 1-16.
APO, Notice of Acceptance for Australian Patent Application No. 2015214298, dated Apr. 20, 2018, 3 pages.
APO, Examination Report No. 1 for Australian Patent Application No. 2015214298, dated Apr. 24, 2017, 3 pages.
APO, Examination Report No. 2 for Australian Patent Application No. 2015214298, dated Nov. 2, 2017, 3 pages.
USPTO, International Search Report and Written Opinion for International Patent Application No. PCT/US2015/014414, dated May 11, 2015, 8 pages.
Blippar, "Computer Vision API", www.web.blippar.com/computer-vision-api, 2018, 4 pages.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
EPO, International Search Report and Written Opinion for International Patent Application No. PCT/US2016/068083, dated Mar. 9, 2017, 13 pages.
EPO, International Search Report for International Patent Application No. PCT/US2017/052713, dated Dec. 5, 2017, 4 pages.
EPO, International Search Report for International Patent Application No. PCT/US2018/022501, dated May 14, 2018, 4 pages.
EPO, International Search Report for International Patent Application No. PCT/US2017/052349, dated Dec. 13, 2017, 5 pages.
EPO, International Search Report for International Patent Application No. PCT/US2017/057044, dated Jan. 18, 2018, 5 pages.
EPO, Written Opinion for International Patent Application No. PCT/US2017/052713, dated Dec. 5, 2017, 6 pages.
EPO, International Search Report for International Patent Application No. PCT/US2018/022503, dated Aug. 16, 2018, 6 pages.
EPO, Written Opinion for International Patent Application No. PCT/US2017/052349, dated Dec. 13, 2017, 6 pages.
EPO, Written Opinion for International Patent Application No. PCT/US2018/022501, dated May 14, 2018, 6 pages.
EPO, Extended European Search Report for European Patent Application No. 15746410.8, dated Sep. 5, 2017, 7 pages.
EPO, Written Opinion for International Patent Application No. PCT/US2018/022503, dated Aug. 16, 2018, 8 pages.
EPO, Written Opinion for International Patent Application No. PCT/US2017/057044, dated Jan. 18, 2018, 8 pages.
EPO, Written Opinion of the International Preliminary Examining Authority for International Patent Application No. PCT/US2017/052349, dated Aug. 6, 2018, 9 pages.
Fuxman, ""Aw, so cute!": Allo helps you respond to shared photos", Google Research Blog, https://research.googleblog.com/2016/05/aw-so-cute-allo-helps-you-respond-to.html, May 18, 2016, 6 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
Lee, et al., "Supporting multi-user, multi-applet workspaces in CBE", Proceedings of the 1996 ACM conference on Computer supported cooperative work, ACM, Nov. 16, 1996, 10 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
EPO, International Search Report and Written Opinion for International Application No. PCT/US2018/021028, dated Jun. 15, 2018, 11 pages.
Pinterest, "Pinterest Lens", www.help.pinterest.com/en/articles/pinterest-lens, 2 pages.
Russell, "Google Allo is the Hangouts Killer We've Been Waiting For", Retrieved from the Internet: http://web.archive.org/web/20160519115534/https://www.technobuffalo.com/2016/05/18/google-allo-hangouts-replacement/, May 18, 2016, 3 pages.
USPTO, Notice of Allowance for U.S. Appl. No. 15/709,418, dated Mar. 1, 2018, 11 pages.
USPTO, Notice of Allowance for U.S. Appl. No. 14/618,962, dated Nov. 8, 2016, 14 pages.
USPTO, Non-final Office Action for U.S. Appl. No. 15/709,418, dated Nov. 21, 2017, 15 pages.
USPTO, Notice of Allowance for U.S. Appl. No. 15/428,821, dated Jan. 10, 2018, 20 pages.
USPTO, Non-final Office Action for U.S. Appl. No. 14/618,962, dated Feb. 26, 2016, 25 pages.
USPTO, Notice of Allowance for U.S. Appl. No. 15/415,506, dated Jul. 23, 2018, 25 pages.
USPTO, Non-final Office Action for U.S. Appl. No. 15/428,821, dated May 18, 2017, 30 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.
USPTO, First Action Interview, Pre-Interview Communication for U.S. Appl. No. 15/415,506, dated Apr. 5, 2018, 5 pages.
USPTO, First Action Interview, Pre-Interview Communication for U.S. Appl. No. 15/350,040, dated Jul. 16, 2018, 5 pages.
Vinyals, et al., "Show and Tell: A Neural Image Caption Generator", arXiv:1411.4555v2 [cs.CV], Apr. 20, 2015, pp. 1-9.
Yeh, et al., "Searching the web with mobile images for location recognition", Proceedings of the 2004 IEEE Computer Society Conference on Pattern Recognition, vol. 2, Jun.-Jul. 2004, pp. 1-6.

* cited by examiner

FUNCTIONAL IMAGE ARCHIVING

CROSS-REFERENCE TO RELATED APPLICATIONS

This application claims priority to U.S. Provisional Patent Application No. 62/609,522, filed Dec. 22, 2017, entitled, "Functional Image Archiving," and which is incorporated by reference herein in its entirety.

BACKGROUND

Digital albums often include images of a utilitarian or functional nature such as images of documents, receipts, credit cards, membership cards, Wi-Fi passwords, memes, etc. When viewing an album, or generating a composition of images, functional images may tend to interrupt a user's flow of viewing, reminiscing or sharing other non-functional images (e.g., family photos, scenic photos, event photos, etc.).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to digital image management, and in particular, to automatically archiving or providing automatic suggestions to archive functional images.

In some implementations, a computer-implemented method includes accessing a plurality of images and determining one or more functional labels corresponding to each of the plurality of images and one or more confidence scores corresponding to the one or more functional labels. The method includes determining a functional image score for each of the plurality of images based on the one or more functional labels having a corresponding confidence score that meets a respective threshold for the one or more functional labels. The method includes, in response to determining that the functional image score meets a functional image score threshold, providing a functional image signal that indicates that one or more of the plurality of images that meet the functional image score threshold are one or more functional images. The method includes determining that the one or more functional images are to be archived, and causing the one or more functional images to be archived by associating an archive attribute with the one or more functional images such that the one or more functional images having the archive attribute are excluded from display in views of the plurality of images.

Various implementations and examples of the method are described, which can be combined in various implementations as well. For example, in some implementations, the method further comprises determining whether one or more images of the plurality of images are included in one or more functional image categories. In some implementations, determining that the one or more functional images are to be archived is further based on determining that the one or more functional images are included in at least one of the one or more functional image categories. In some implementations, determining that the one or more functional images are to be archived is performed automatically when the one or more functional image categories correspond to predetermined archiving categories and the functional image score meets a respective archiving threshold for the one or more functional image categories. In some examples, the one or more functional image categories include at least one of: receipt, document, newspaper, note, product label, restaurant menu, identification, screenshot, or business card.

In some implementations, determining one or more functional labels corresponding to each of the plurality of images and one or more confidence scores corresponding to the one or more functional labels includes programmatically analyzing one or more pixels of each of the plurality of images to detect content of the respective images, identifying one or more labels corresponding to each of the plurality of images based on the content of the image, determining whether one or more functional labels are present within the one or more labels; and, if one or more functional labels are present, selecting the one or more functional labels and the one or more corresponding confidence scores to associate with one or more respective images of the plurality of images. In some examples, determining whether one or more functional labels are present within the one or more labels includes determining whether the one or more functional labels match predetermined labels associated with a functional image designation.

In some implementations, the method further comprises determining a recommendation to archive the functional images, where the recommendation is based on respective functional image scores; and causing output of the recommendation by a device, where determining that the one or more functional images are to be archived is based on user input received at the device in response to the providing the recommendation. In some examples, causing output of the recommendation includes displaying a user interface card and a visual representation of at least a subset of the one or more functional images. In some examples, the recommendation includes at least one category associated with at least one of the one or more functional images, where the at least one category is based on the one or more functional labels for the one or more functional images. In some examples, the recommendation is provided by surfacing a suggestion chip element in a user interface that displays the image.

In some implementations, the method is performed at one of: a time the plurality of images is obtained; or a time after a time period elapses after the plurality of images was obtained. In some implementations, determining the functional image score includes programmatically analyzing one or more of image content data associated with one or more of the plurality of images and metadata associated with one or more of the plurality of images. In some implementations, the method further comprises automatically unarchiving at least one of the one or more archived functional images in response to one or more unarchiving criteria being met.

In some implementations, a system includes a memory and at least one processor configured to access the memory and configured to perform operations. The operations include accessing an image and determining one or more functional labels corresponding to the image and one or more confidence scores corresponding to the one or more functional labels. The operations include determining a functional image category for the image and a functional image score for the image based on the one or more functional labels having a corresponding confidence score that meets a respective threshold for the one or more functional labels. The operations include, in response to determining that the functional image score meets a functional image score threshold, providing a functional image signal that indicates the image is a functional image. The operations include generating an identifier associated with the image based on the functional image signal, where the identifier includes the functional image category, and archiving the image in response to the functional image category being an archiving category and the functional image score meeting an archiving threshold.

In various implementations of the system, the at least one processor is further configured to perform operations comprising determining and causing output of a recommendation to archive the functional image based on the functional image score, where the operation of archiving the image is in response to user input received in response to the providing the recommendation. In some implementations, the operation of determining one or more functional labels corresponding to the image and the one or more confidence scores corresponding to the one or more functional labels includes determining whether the one or more functional labels match predetermined labels associated with a functional image designation.

In some implementations, a non-transitory computer readable medium has stored thereon software instructions that, when executed by a processor, cause the processor to performing operations including accessing a plurality of images, determining one or more functional labels corresponding to each of the plurality of images and one or more confidence scores corresponding to the one or more functional labels, and determining a functional image score for each of the plurality of images based on the one or more functional labels having a corresponding confidence score that meets a respective threshold for the one or more functional labels. The operations include, in response to determining that the functional image score meets a functional image score threshold, providing a functional image signal that indicates that one or more of the plurality of images that meet the functional image score threshold are one or more functional images. The operations include determining whether one or more images of the plurality of images are included in one or more functional image categories, and, in response to determining that the one or more images of the plurality of images are included in one or more functional image categories, determining that the one or more functional images are to be archived. The operations include causing the one or more functional images to be archived by associating an archive attribute with the one or more functional images such that the one or more functional images having the archive attribute are excluded from display in views of the plurality of images.

In various implementations of the computer readable medium the operation of determining one or more functional labels and one or more confidence scores includes programmatically analyzing one or more pixels of each of the plurality of images to detect content of the respective images, identifying one or more labels corresponding to each of the plurality of images based on the content of the image, determining whether one or more functional labels are present within the one or more labels, and, if one or more functional labels are present, selecting the one or more functional labels and the one or more corresponding confidence scores to associate with one or more respective images of the plurality of images. In some implementations, further operations include determining a recommendation to archive the functional images based on respective functional image scores, and causing output of the recommendation by a device, where determining that the one or more functional images are to be archived is based on user input received at the device in response to the providing the recommendation.

DETAILED DESCRIPTION

Figure 1:
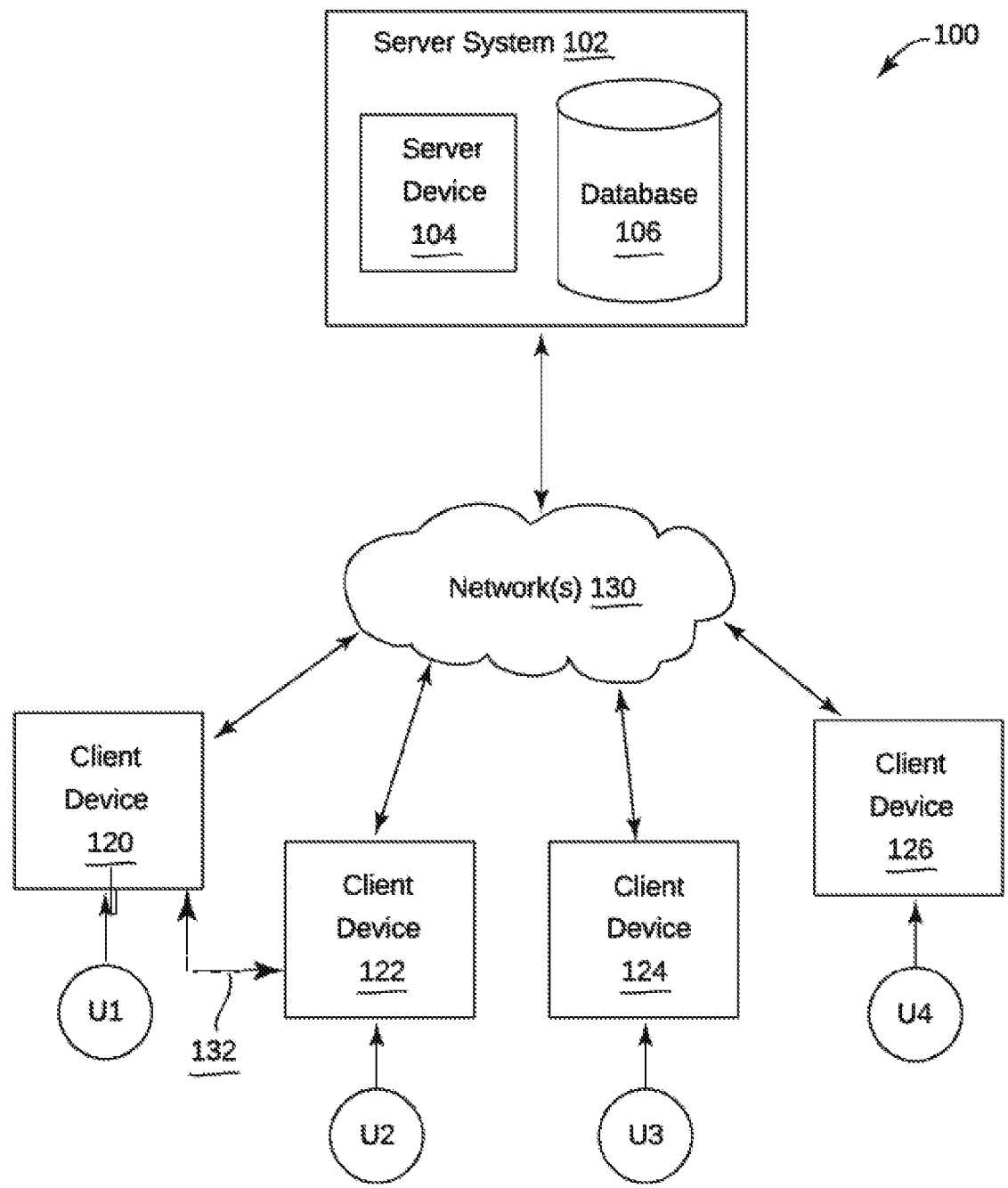
FIG. 1 is a block diagram of example systems and a network environment which may be used for one or more implementations described herein.

Some implementations include methods and systems to determine which images among an incoming stream of images are functional in nature and to archive those functional images and/or suggest archiving those functional images. Images can include single images (e.g., photos), animated images, videos, graphics, etc. For example, a user may capture an image of a receipt from a store for warranty or other purposes. The system can detect that this image is likely a functional image of a receipt and generate a functional image signal indicating that the image is a functional image. Some additional examples of functional images include images of checks, medical prescriptions, advertisements, printed material, newspapers, product labels, restaurant menus, handwritten notes, instruction manuals, business cards, driver's licenses, passports (and other person identifications), screenshots, whiteboard or blackboard, memes, home projects (e.g., images of building or project materials), etc. Functional images can include images taken by a user for functional purposes, such as reminders, to store information, etc.

Some examples of non-functional images can include images that depict human faces or persons, images that have photographic characteristics, images with artistic composition or other creative attributes, images of animals, images of geographic scenery, images captured with certain settings (e.g., images with depth of focus), etc. Based on the functional image signal, the system can perform an action such as make a recommendation to archive the image, automatically archive the image, etc.

An image as referred to herein can include a digital image having pixels with one or more pixel values (e.g., color values, brightness values, etc.). An image can be a static image (e.g., a single frame with no motion), a dynamic image (e.g., animated image, animated GIFs, cinemagraphs where a portion of the image includes motion while other portions are static, etc.), a video (e.g., a sequence of a plurality of images or image frames that may include audio), etc. For example, a static image may depict one or more objects, while an animated image may depict one or more objects that change within the image (e.g., a live photo that captures a face with eyes transitioning between closed and open, face with the mouth moving from a non-smiling to a smiling position, etc.). A video may include a plurality of frames that depict one or more persons.

While the remainder of this document refers to an image as a static image, it may be understood that the techniques described herein are applicable for dynamic images, video, etc. For example, implementations described herein can be used with still images (e.g., a photograph, an emoji, or other image), videos, or dynamic images). Functional image archiving suggestions may be provided for any type of image and may include a group of images of same and/or different types. Text, as referred to herein, can include alphanumeric characters, emojis, symbols, or other characters.

Archiving an image includes designating the image as archived, e.g., by associating the image with data (e.g., metadata or other associated data) that indicates the image has been archived, e.g., data such as an archive attribute. In various implementations, archived images can be processed, displayed, stored, etc. differently than non-archived images based on the archived status. In one or more implementations described herein, archived images are hidden from display in displayed views of non-archived images (unless user input is received that instructs archived images to be displayed in such a view). For example, archived images can be excluded from being displayed in a main gallery or primary display of images.

In some implementations, images are analyzed to determine a functional image score. The analyzing can include performing image content analysis to determine content of the image, determining one or more labels to the image based on the content, and identifying functional labels within the one or more labels applied to the image. The labels can include an associated confidence score that can be thresholded to identify labels with highest confidence. Within the labels, functional labels can be identified, e.g., by looking up a list of predetermined labels associated with functional images and/or by using a machine-learning model trained to identify labels associated with functional images. Analyzing the images for functional image score can also include analyzing metadata in some implementations. Some implementations can include determining a functional image score for each image in a plurality of images, sorting the images according to the functional image score, and selecting a number of images (e.g., the top 5, the top 10, or a top percentage) for archival recommendation.

The functional image signal may be generalized to an indication of an image that is functional in nature. For example, in addition to being useful for archiving suggestions and/or automatically archiving, a signal that indicates that an image is likely a functional image can be used for excluding or filtering functional images from automatically generated creations (e.g., photo books, image animations, collages, stories, etc.).

The recommendation to archive an image (or images) can be surfaced (or displayed) as a suggestion card (e.g., FIG. 5) in a graphical user interface (e.g., as part of an assistant application, when a photos application is opened, at a given time interval, etc.) or displayed as a chip (selectable user interface element), e.g., on or near a single image being viewed in a user interface such as a user interface of an image display or editing application or a camera application. In some implementations, the functional image analysis may be performed a given time period after the image was acquired (e.g., one week later, etc.).

In some implementations, functional image archiving suggestions can be personalized to user behavior (e.g., using a machine-learning model as described herein) to suggest archiving more of the types of images that the user archives and less of the types of utility photos that the user does not archive, for example.

When making functional image archiving suggestions to a user, it may be helpful for an image system to make functional image archiving suggestions that are in line with a user's previous functional image archiving activity. To make functional image archiving suggestions, a probabilistic model (or other model as described below in conjunction with FIG. 4) can be used to make an inference (or prediction) about how likely an image is to be a functional image and how likely a user is to archive an image or group of images. Accordingly, it may be helpful to make an inference regarding a probability that an image is a functional image.

The inference based on the probabilistic model can include predicting a whether an image is a functional image, determining a confidence score for the prediction, and making functional image archiving suggestions in accordance with functional image and confidence score as inferred from the probabilistic model. The probabilistic model can be trained with data including previous functional image archiving activity of one or more users. Some implementations can include generating a functional image archiving suggestion for one or more images having a functional image score based on objects in the image or data associated with functional images. The functional image score may be based on an inference from a probabilistic model that is trained using data for which respective users have provided permission for use in training the probabilistic model. Such data may include user image data and image activity data (e.g., archiving data). Each image can be annotated with one or more labels and a confidence score for a respective label.

An implementation of the system or method described herein can be integrated with an image management system. For example, a probabilistic model for functional image archiving as described herein can be added to a configuration of an image management system or framework (e.g., at a server system, a cloud based computing system, or within a user device such as a mobile device, laptop or desktop computer).

The systems and methods provided herein may overcome one or more deficiencies of some conventional image management systems and methods. For example, image management includes enabling users to capture, store, and/or share images (e.g., digital images represented as data stored in a nontransitory computer readable medium) with other users. With the easy availability of digital image capture devices, such as digital cameras, phones with built-in cameras, wearable devices with cameras, head-mounted devices, tablets, personal computers, etc., users may capture a large number (e.g., a hundred, a thousand, etc.) of images. Conventional image management systems may enable users to manually archive images. Conventional image management systems may permit archiving images upon user commands to archive the images. For example, a user may have functional images interspersed with images from a significant event, e.g., a wedding, a graduation, etc. with other users, e.g., friends, family members, colleagues, etc. Manually archiving the functional images in some conventional system may require the user to manually look through numerous images and manually archive each functional image. In this manner, conventional image management systems may not provide automatic functional image archiving and/or functional image archiving suggestions, where sharing such functional image archiving and/or suggestions for functional image archiving may be useful to the user.

The example systems and methods described herein may overcome one or more of the deficiencies of conventional image management systems to provide users functional image archiving. A technical problem of some conventional image management systems may be that such systems do not suggest functional image archiving of images based on functional image labels and corresponding confidence scores. In conventional image managements systems, views of images, e.g., a main view, may display images in various layouts, e.g., as a grid. In these systems, functional images may be displayed alongside images that are not functional, e.g., photographs or videos that depict people, scenery, monuments, or other objects of photographic interest. Display of functional images in such views may provide an undesirable user experience. For example, a view that displays a user's photographs from a vacation may include images that the user captured of restaurant receipts, tickets, boarding passes, and other functional images that are not of interest when the user is reviewing the vacation, e.g., at a later time. Conventional systems include such images in the view, e.g., in a chronological view and require the user to manually filter such images.

The disclosed subject matter relates to particular techniques to archive or to generate suggestions to archive a group of functional images, e.g., as a single image, a group of images, or an image composition such as an image album, video, collage, etc. The suggestions are based on instantiating a process on a computer to determine a functional image score representing whether an image is a functional image, where the functional image score is determined based on the image and/or data associated with the image. The process on the computer can determine one or more images to be recommended for archiving based on objects in the images and prior images that were archived.

The systems and methods presented herein automatically provide suggestions to archive functional images that are more likely to be accepted by users and that likely contain functional images. Particular implementations may realize one or more of the following advantages. An advantage of generating suggestions for functional image archiving based on methods and system described herein is that images likely suitable for archiving are presented to the user automatically, without the user having to browse image collections, select images, designate archival status to images, etc., thus saving device resources such as display processing and other processing, memory, etc. Another advantage is that the suggestions are based on a functional image score and confidence. Another advantage is that, if an image is not found to be functional, image archiving suggestions may not be provided, thereby reducing or eliminating generation of archiving suggestions that a user may not approve, which can result in fewer processing operations and thus reduce latency in the overall system. A further advantage of some implementations is that the suggestion can be based on a user's previous archiving activity, which can permit the image archiving suggestions to be tailored to different users. Yet another advantage is that the methods and systems described herein can dynamically learn new thresholds (e.g., for confidence scores, etc.) and provide suggestions for images that match the new thresholds.

Archiving of functional images is described herein to help illustrate the disclosed subject matter. Functional images can include images of documents (e.g., receipts, documents, tickets, etc.) physical objects (e.g., product labels, whiteboards, parking location, screenshots, license plates, etc.), identification documents (e.g., passports, driver's licenses, identification cards, business cards, etc.), and/or transactional cards (e.g., credit cards, loyalty program cards, library cards, discount cards, etc.). It will be appreciated that the disclosed functional image archiving can be applied to images other than functional images, such as poor quality images (e.g., pocket shots, blurry images, poorly exposed images, etc.), near duplicates (e.g., the lowest quality near duplicate images), and gifted images (e.g., memes, etc., which can include images received via a social network, messaging service, or the like).

In some implementations, detected functional images can be marked by adding an identifier that is indexed by functional image category and/or confidence score. Images can be marked as archive suggestions during an upload process. Archiving suggestions can be fetched by category and minimum confidence. In some implementations, each image may have suggestions of multiple types, but only one category (e.g., functional or gifted) per type (e.g., receipt category in the functional type). Other implementations can provide multiple categories per type. Suggestions can be separated into categories to help facilitate automated archiving for user-determined (or machine-learning model determined) reliable categories. Suggestions can also be marked as accepted/dismissed when users act on the suggestions. In some implementations, a single suggested archive card may be displayed or surfaced within a graphical user interface. The suggested archive card contents and position (e.g., in an assistant view) can be updated as suggestions are added (uploaded) or removed (deleted). Content of a suggested archive card can be populated by a notification renderer. Latest suggestions to archive can be fetched upon request to see the card to account for any manual archiving or suggestion deletion and insertion. Dismissed suggested archive cards can imply rejecting one or more archive suggestions contained in the card and the rejection can be used as training data to train and/or tune a machine-learning model as discussed herein.

Some implementations can include generating a functional image signal that represents a prediction of whether a particular image suggested for archiving will be archived by a user. The functional image signal can include a single-source prediction or a multiple-source prediction (e.g., determining a functional image signal based on multiple images). A single-source functional image prediction signal is based on a single image. Single-source predictions can be used for functional images and/or different categories of images, etc. Multiple-source functional image signal prediction can be used, for example, for worse duplicates archiving suggestions (e.g., recommending lower quality duplicate or near-duplicate images for archiving, such as images captured in a burst or near in time at the same location).

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other data store or data storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on client devices 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide a functional image archiving program. The functional image archiving program may allow a system (e.g., client device or server device) to provide suggestions for archiving images that are likely to be functional images, some examples of which are described herein. The functional image archiving program can provide associated user interface(s) that are displayed on a display device associated with the server system or client device. The user interface may provide various options to a user to select archive images, etc. Other applications can also be used with one or more features described herein, such as image management applications, browsers, email applications, communication applications, etc.

Various implementations of features described herein can use any type of system and/or service. For example, social networking services, image collection and sharing services, assisted messaging services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
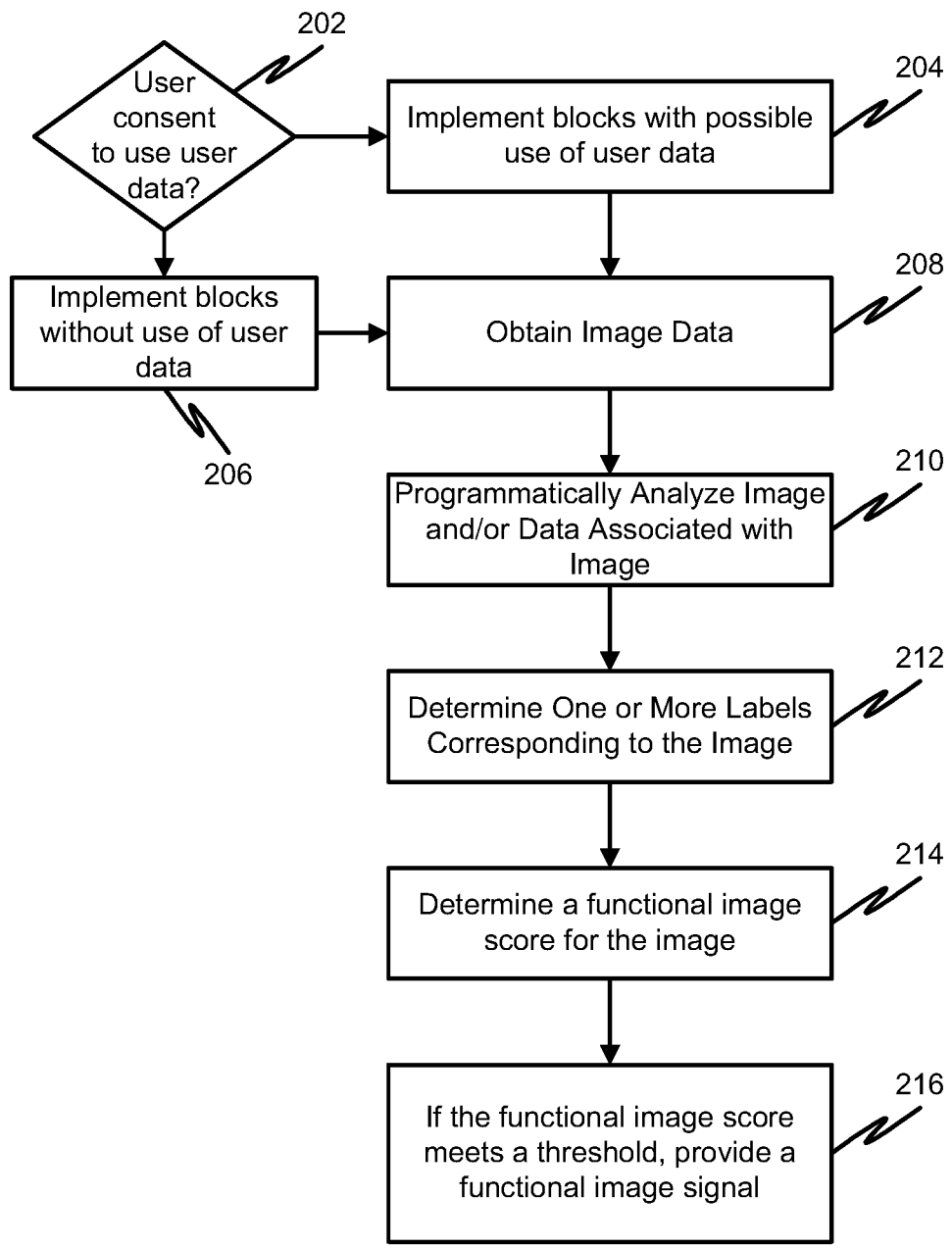
FIG. 2 is a flow diagram illustrating an example method of functional image archiving, according to some implementations.

FIG. 2 is a flow diagram illustrating an example method 200 to generate a functional image signal and optionally perform one or more actions based on the functional image signal, according to some implementations.

In some implementations, method 200 can be implemented, for example, on a server system 102 as shown in FIG. 1. In other implementations, some or all of the method 200 can be implemented on one or more client devices (e.g., client devices 120, 122, 124, or 126 as shown in FIG. 1), one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input.

In some implementations, the method 200, or portions of the method, can be initiated automatically by a device. For example, the method (or portions thereof) can be periodically performed or performed based on the occurrence of one or more particular events or conditions. For example, such events or conditions can include a particular application being opened by a user, an elapsed time since obtaining one or more images that have been captured by, uploaded to, or otherwise accessible by a device (e.g. a user device), a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to a large collection of accessible images, e.g., a user's collection of images (if user consent is received). In another example, a camera, cell phone, tablet computer, wearable device, or other client device can capture one or more images and can perform the method 200. In addition, or alternatively, a client device can send one or more captured images to a server over a network, and the server can process the images using method 200.

In block 202, it is checked whether user consent (e.g., user permission) has been obtained to use user data in the implementation of method 200. For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, calendar and appointments, content, ratings, and opinions created or submitted by a user, a user's geographical location, historical user data, etc. One or more blocks of the methods described herein may use such user data in some implementations. Block 202 may be performed as part of a sharing suggestion framework and/or to verify consent provided at the functional image archiving suggestion framework level such that blocks 204 and on will only be invoked if user consent for performing the functional image archiving suggestions was obtained at the functional image archiving suggestion framework level. If user consent has been obtained from the relevant users for which user data may be used in the method 200, then in block 204, it is determined that the blocks of the methods herein can be implemented with possible use of user data as described for those blocks, and the method continues to block 206. If user consent has not been obtained, it is determined in block 206 that blocks are to be implemented without use of user data, and the method continues to block 206. In some implementations, if user consent has not been obtained, the remainder of method 200 is not performed, and/or particular blocks needing the user data are not performed.

In block 208, image data is obtained for one or more images. Image data can include image pixel data (e.g., image content) and/or other associated image data (e.g., metadata) including information about when (e.g., time and date stamp), how (e.g., imaging device type and settings, etc.) and where (e.g., location data) an image was acquired. The image data can also optionally include one or more labels identifying respective objects or attributes within the image that have previously been associated with the image. The labels may include a corresponding confidence value representing a statistical confidence (or other type of confidence value) of the accuracy of the label with respect to the image. The method continues to 210.

In block 210, the image data is programmatically analyzed. For example, at least a portion of the image data may be programmatically analyzed by an image content analysis (ICA) system that identifies features (e.g., objects, attributes, landscape features, and/or other features) depicted within the image data (e.g., depicted in image pixels for visual display). The ICA system can be part of the functional image archiving system, can be part of the image management system that includes the functional image archiving system, or can be a separate system. Programmatically analyzing the image may include analyzing the image using a trained machine learning model that is trained to identify features within the image, e.g., using image pixel data and/or image metadata. The method continues to block 212.

In block 212, one or more labels corresponding to the image are determined. For example, the image content analysis system may provide an indication of one or more labels associated with the image based on analysis of the image data (e.g., based on analysis of image content and/or metadata). For example, the labels can be determined based on the content of the image, e.g., one or more features identified in the image data in block 210. In some implementations, programmatically analyzing image data and determining labels for one or more images can be performed on the client side as a cloud service. In some implementations, a low resource image content analysis model can be deployed on a client device (e.g., a mobile device). The low resource image content analysis model may use a simplified approach to programmatically analyzing an image and determining labels for the image. For example, the low resource image content analysis model may identify that a quantity of text in a photo meets a threshold and use that signal in isolation to determine that the image is a functional image. In another example, the functional image archiving system may determine the one or more labels based on a result from the programmatic analysis performed by the image content analysis system. The one or more labels can also include one or more corresponding confidence scores. In some implementations, a trained machine learning model may be used to determine one or more labels for the image. In some implementations, the labels may correspond to semantic concepts, e.g., semantic concepts based on the features identified in the image. In some implementations, the semantic concepts may be organized in a hierarchy, e.g., "sports→baseball→baseball bat," etc. The method continues to block 214.

In block 214, a functional image score for the image is determined. The functional image score can indicate the suitability of the image for archiving, e.g., the score can represent a predicted likelihood of a user designating the image for archiving.

In some implementations, a machine-learning model can determine a functional image score for an image based on labels that the model has determined are related to functional images and on threshold values determined by the model for each of the labels related to functional images. For example, the model can be (previously) trained based on images having functional content. In some implementations, other models or techniques can be used to determine the functional image score, e.g., statistical methods, graph-based models, etc.

In some implementations, the label confidence scores of the labels for the image can be used in the determination of the functional image score. In some implementations, as part of functional image score determination, the label confidence scores may be mapped from a first space (e.g., the image content analysis space) to a second space (e.g., a functional image archiving score space). The mapping can be performed to adjust for the potential difference between a likelihood in the image content analysis space that an object/feature is identified accurately, and a likelihood in the functional imaging archive space that the labeled object/feature represents a functional image that will likely be archived. Mapping of a score from image content analysis space to functional image archiving space can improve accuracy for archival purposes. For example, a probability of an object being in an image may be different from a probability of archiving an image with that object (e.g., a 0.2 image content analysis space may correspond to 0.8 in a functional image archive space of a suggestion model). A calibration may need to be performed when an image content analysis system is updated to update the mapping from the image content analysis space to the functional image archiving space. The calibration can be confined to updating the image content analysis system and performing the calibration. By using the calibration technique, the thresholds in functional image archiving score space may be unaffected by an image content analysis system update. The calibration may be performed by a machine-learning model.

In some implementations, one or more functional labels (and corresponding functional image archive space confidence scores) may be identified from the one or more labels associated with the image. In some examples, a functional label is a label that associated with functional images. One or more of the labels can be identified as functional labels, e.g., by comparing the labels to a list of predetermined labels associated with a functional image designation and selecting the labels that match, e.g., have an exact match with or a semantic match with one or more of the predetermined labels. In some implementations, functional labels can be identified among the labels by using a machine-learning model that has been trained to identify labels associated with functional images.

In some implementations, the corresponding confidence scores of the labels can be thresholded to identify labels with higher confidence scores (e.g., scores above a threshold) and/or highest confidence scores among the labels (e.g., the scores indicating the greater or greatest confidence in the accuracy of the associated labels). These identified labels can be used to determine the functional image score. In some implementations, the corresponding confidence scores of functional labels (identified as described above) can be thresholded in this manner to determine the functional labels to be used in determining the functional image score. For example, the thresholded confidence scores can be functional image archive space confidence scores as described above.

In some implementations, the functional image score can be based on one or more of the functional labels and corresponding functional image archive space confidence scores. In one example, the functional image score can be based, at least in part, on the confidence scores associated with functional labels, e.g., a higher functional image score is determined from higher confidence scores. In some implementations, the functional image score can be based, at least in part, on the amount of (thresholded) functional labels identified for the image, e.g., the greater the number of such functional labels, the more that the functional image score indicates that the image is suitable for archiving (e.g., a greater functional image score can indicate a higher likelihood of archiving). In some implementations, particular functional labels can be designated to have greater weight and provide a greater contribution to the functional image score than other particular functional labels (e.g., a greater value added to a functional image score total). For example, a functional label of "text" can cause a greater increase in functional image score than a functional label of "paper sheet."

In some implementations, a functional image score can be based at least in part on locations of detected content features within an image, and/or other visual contexts of detected features. For example, if a face is detected to one side of an image, is surrounded by a square frame, and is located next to text, then the functional image score can be increased, e.g., since the face may be part of a functional image of a passport, driver's license, or other personal identification that typically have such a layout.

Determining the functional image score can also be based on metadata of the image, in some implementations. For example, metadata can be used to adjust a functional image score. In some examples, geographical location of capture of the image can influence the functional image score, based on the type of location, e.g., home, business or store, etc. (e.g., a business or store location can adjust the functional image score to indicate greater likelihood that the image is a functional image). In some implementations, other types of image metadata can be used to determine the functional image score, e.g., EXIF data (describing settings or characteristics of a camera capturing the image), timestamp, etc.

When a plurality of images are being analyzed, some implementations can include determining a functional image score for each image of the plurality of images, sorting the images according to the functional image score, and selecting a number of images (e.g., the top 5, the top 10, or a top percentage) for archival recommendation.

In some implementations, a blacklist and/or a whitelist can be employed. The blacklist or whitelist may include particular content features that, if detected as present in an image, automatically disqualify the image from being a functional image (e.g., if using a blacklist) or automatically qualify the image to be functional image (e.g., if using a whitelist). For example, a blacklist can include content features such as faces, person, child, etc.

In some implementations, one or more functional image categories can also be determined for the image, e.g., in block 214 (or other block of the method 200 or method 300 described below). In some examples, the image can be determined to be included in the one or more functional image categories based on the labels determined for the image as described above. In various implementations, a determined functional image category can be a broad category (e.g., "functional image") or a more specific category (e.g., "receipt," "business card," etc.). In some implementations, each functional image category can be associated with one or more category labels, such that if one or more labels of the image match (e.g., exactly match or semantically match) one or more corresponding category labels, the image can be designated to be included in that category. In some examples, if a threshold number of labels of an image match category labels of a category, then the image can be designated to be included in that category. For example, a "receipt" category can be associated with category labels such as "text," "numbers," "prices," "sheet of paper," etc., and the image can be determined to be included in the "receipt" category based on having one or more labels that match these category labels. In some implementations, a machine-learning model can be used to determine a functional image category for an image based on labels that the model has determined are related to that functional image category. For example, the model can be (previously) trained based on images having features (labels) that are included in designated functional categories.

In some implementations, the image can be determined be included in multiple functional image categories, e.g., a "receipt" category and a "document" category. In some implementations, a category confidence score is determined for each category determined for the image, where the category confidence score indicates a likelihood or confidence that the image belongs to that category (e.g., based on the confidence scores associated with the predefined labels that are associated with that category, based on the number of labels that match the predefined labels associated with that category, and/or based on output of a machine learning model that has been trained with multiple images of that category). In some implementations, a single category is determined for an image, which can be selected, for example, as the category having the highest category confidence score.

In some implementations, a functional image identifier can be generated and associated with one or more of the images, e.g., can be associated with images that are included in all or particular functional image categories, or associated with all of the images. For example, the functional image identifier can be metadata or other associated data. The functional image identifier specifies one or more functional image categories for each associated image and a category confidence score associated with each of the functional image categories. In some implementations, the functional image identifier can specify image type, which can be such types as "functional", "non-functional", or other types, etc. The functional image identifier can be generated and/or associated with images at any of various stages, e.g., prior to method 200, during one or more blocks of method 200, in method 300 (described below), etc. The method continues to 216.

In block 216, a functional image signal is provided if the functional image score determined in block 214 meets a functional image score threshold. The functional image signal indicates that the image is a functional image. For example, the functional image signal can include a software signal, e.g., designation or attribute for the image that indicates that the image meets the functional image score threshold. In some implementations, a functional image signal can be associated with multiple images, indicating that each of those images is a functional image.

In some implementations, the functional image signal can be provided to another process that can optionally act on the functional image signal. For example, one or more actions can be performed based on the functional image signal. For example, as described below in method 300, actions can be performed on images associated with a functional image signal, including, for example, auto-archiving, archiving based on user input, or deleting the images. In some implementations, the functional image scores of the associated images can be provided with the functional image signal. In some implementations, information indicating one or more determined functional image categories, and category confidence scores for those categories, can also be provided in association with the functional image signal for each of the associated images (e.g., if the image meets the functional image score threshold), such as the functional image identifier. In some implementations, some or all such information can be associated and accessed with the image, e.g., as metadata.

In some implementations, in addition to the use of a low resource image content analysis model as described above, a low resource functional image score model can be used that can include a simplified model for generating the functional image signal.

In FIG. 2, various blocks (e.g., blocks 202-218) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

Figure 4:
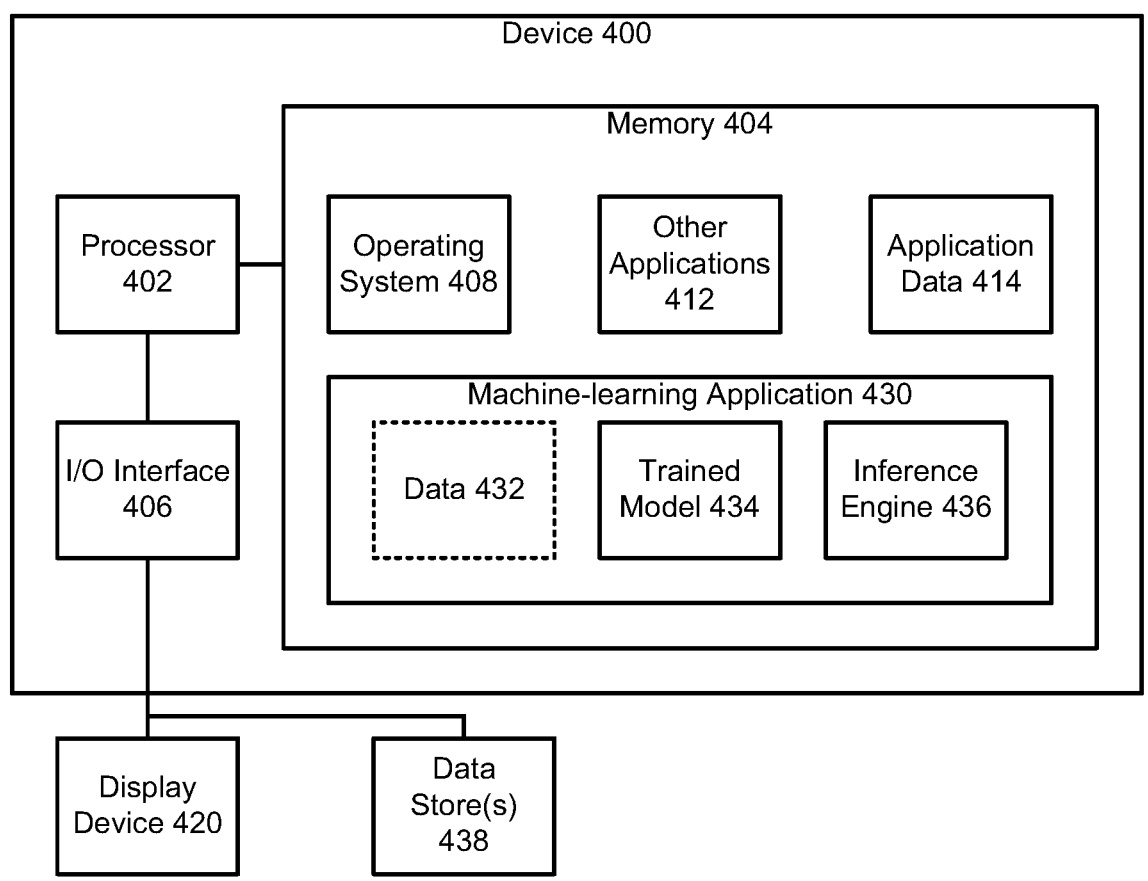
FIG. 4 is a block diagram of an example computing device which may be used for one or more implementations described herein.

Blocks 214 and 216 of FIG. 2 describe optionally utilizing a probabilistic model (or other type of model as described above or, e.g., in conjunction with FIG. 4) to determine image labels and to generate a functional image score, respectively. In some implementations, when users permit the use of their data for sharing, the probabilistic model can be based on shared data from such users. For example, with user consent, different probabilities may be determined for each user account and be used to determine the probability that a given image may be archived. The probabilities may be aggregated (e.g., across a plurality of users that provide consent to such use of their sharing data) to provide a statistical distribution for archiving probabilities. Such statistical distribution can be used in the probabilistic model. In generating the statistical distribution, user accounts of users who do not consent to such use of sharing data are excluded. Further, metadata regarding whether an image is shared and whether the image includes a top cluster may be used, and no use is made of image content.

Figure 3:
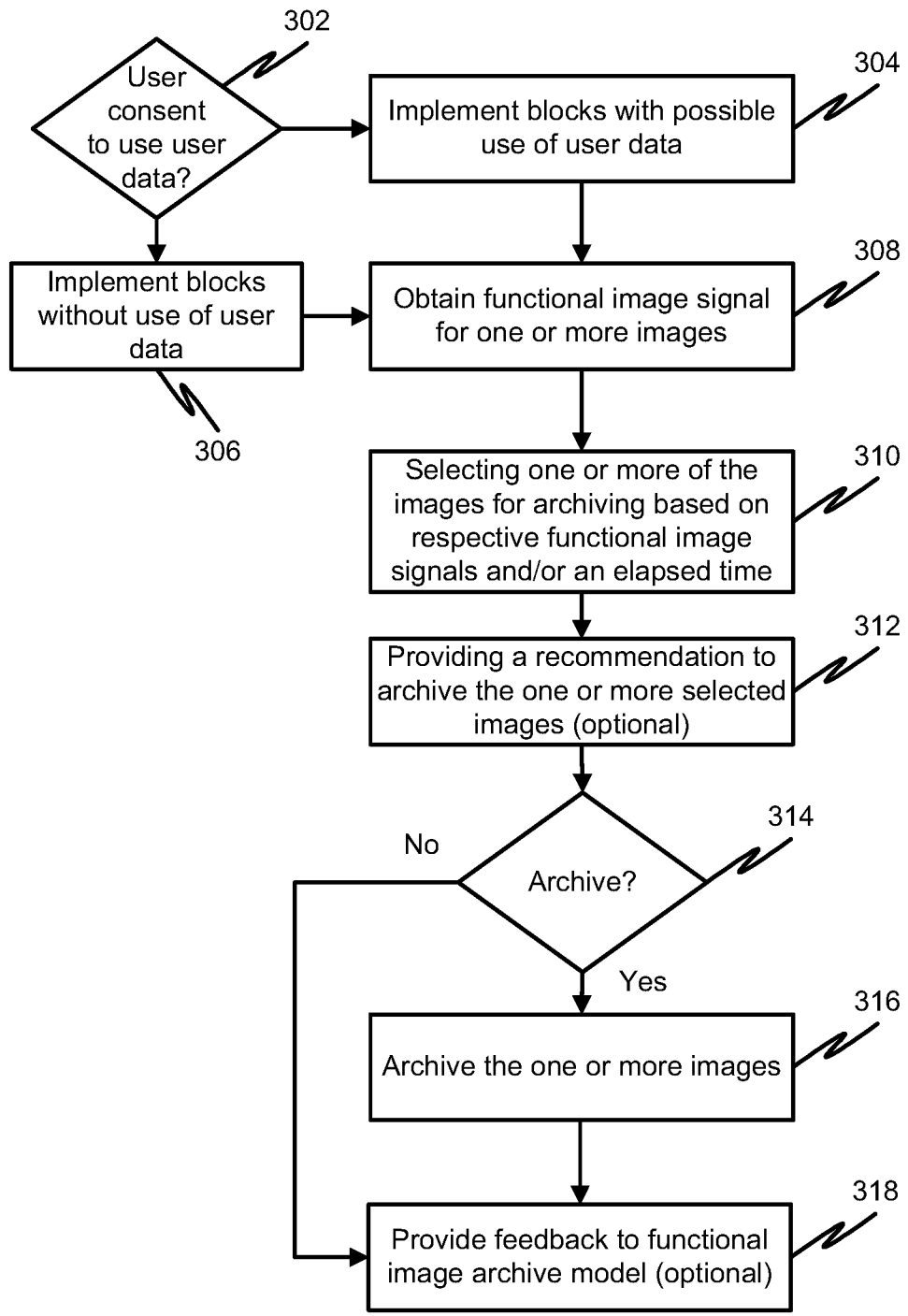
FIG. 3 is a flow diagram illustrating an example method of functional image archiving, according to some implementations.

FIG. 3 is a flow diagram illustrating an example method 300 for functional image archiving, according to some implementations.

In some implementations, method 300 can be implemented, for example, on a server system 102 as shown in FIG. 1. In some implementations, some or all of the method 300 can be implemented on one or more client devices (e.g., client devices 120, 122, 124, or 126 as shown in FIG. 1), one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 300.

Some implementations can initiate method 300 based on user input. A user may, for example, have selected the initiation of the method 300 from a displayed user interface. In some implementations, method 300 or portions thereof can be performed with guidance by the user via user input.

In some implementations, the method 300, or portions of the method, can be initiated automatically by a device. For example, the method (or portions thereof) can be periodically performed or performed based on the occurrence of one or more particular events or conditions. For example, such events or conditions can include a particular application being opened by a user, obtaining one or more images that have been newly captured by, uploaded to, or otherwise accessible by a device (e.g., a user device), a predetermined time period having elapsed since such images were obtained, a predetermined time period having expired since the last performance of method 300, and/or one or more other events or conditions occurring which can be specified in settings of a device implementing method 300. In some implementations, such conditions can be previously specified by a user in stored custom preferences of the user (accessible by a device or method with user consent). In some examples, a device (server or client) can perform the method 300 with access to a large collection of accessible images, e.g., a user's collection of images (if user consent is received). In another example, a camera, cell phone, tablet computer, wearable device, or other client device can capture one or more images and can perform the method 300. In addition, or alternatively, a client device can send one or more captured images to a server over a network, and the server can process the images using method 300.

In block 302, it is checked whether user consent (e.g., user permission) has been obtained to use user data in the implementation of method 300. For example, user data can include user preferences, user images in an image collection (e.g., images captured by a user, uploaded by a user, or otherwise associated with a user), information about a user's social network and/or contacts, user characteristics (identity, name, age, gender, profession, etc.), social and other types of actions and activities, calendar and appointments, content, ratings, and opinions created or submitted by a user, a user's geographical location, historical user data, etc. One or more blocks of the methods described herein may use such user data in some implementations. Block 302 may be performed as part of a functional image archiving and/or functional image archiving suggestion framework and/or to verify consent provided at the sharing suggestion framework level such that blocks 304 and on will only be invoked if user consent for performing the sharing suggestions was obtained at the functional image archiving suggestion framework level. If user consent has been obtained from the relevant users for which user data may be used in the method 300, then in block 304, it is determined that the blocks of the methods herein can be implemented with possible use of user data as described for those blocks, and the method continues to block 306. If user consent has not been obtained, it is determined in block 306 that blocks are to be implemented without use of user data, and the method continues to block 306. In some implementations, if user consent has not been obtained, the remainder of method 300 is not performed, and/or particular blocks needing the user data are not performed.

In block 308, a functional image signal is obtained for one or more images being accessed. For example, the functional image signal can be obtained as a signal accompanying the one or more images when the one or more images are received as input to an image management program. In another example, the functional image signal can be obtained in response to a given amount of time elapsing since the one or more images were captured or acquired (e.g., 7 days, 30 days, etc.). In another example, the functional image signal can be obtained in response to a request for functional image analysis on the one or more images prior to a system automatically generating a media creation such as a slide show or story (e.g., a format that includes one or more images, and other content such as text, emojis, clipart, backgrounds, etc., optionally arranged in predetermined layouts, e.g., on a webpage). In some implementations, functional image scores for the one or more images are obtained in association with the functional image signal. In some implementations, information indicating one or more determined functional image categories, and category confidence scores for those categories, for the one or more images can also be obtained in association with the functional image signal, e.g., a functional image identifier, as described above, can be obtained. The method continues to block 310.

In block 310, one or more of the images are selected for archiving based on one or more archiving criteria that are based on the functional image signal and/or elapsed time. For example, the archiving criteria can specify that selected images should be associated with a functional image signal and have a functional image score that meets an archiving score threshold. In various implementations, the archiving score threshold can be the same as the functional image score threshold described above for FIG. 2, or can be a different threshold, e.g., a threshold requiring greater confidence (e.g., a higher threshold score).

In further examples, the archiving criteria can include elapsed time criteria specifying that a given time period (e.g., 30 days) has elapsed since the selected images were captured, first accessed, or obtained by the auto-archiving system.

In further examples, the archiving criteria can specify that selected images should be included in one or more archiving categories designated for archiving (e.g., "receipts," etc.). In various implementations, the archiving categories can be the same as or a subset of the functional image categories described above. In some implementations, a functional image identifier is associated with each of the selected images (e.g., as described with respect to FIG. 2), where the functional image identifier specifies one or more functional image categories for each associated image and a category confidence score associated with each of the functional image categories (and/or can specify image type, which can be such types as "functional," "non-functional," or other types, etc.). Such a functional image identifier can be examined to determine if selected images meet the archiving criteria specifying one or more archiving categories.

In further examples, each archiving category can be associated with a category confidence score threshold for that category, e.g., a minimum confidence score for that category. The archiving criteria can specify that a selected image should have a category confidence score that meets the category confidence score threshold for the particular archiving category (or categories) in which the image is included.

In some implementations, an auto-archiving system can request that images meeting particular archiving criteria be archived without requiring user input or intervention (e.g., without providing suggestions of block 312). In some implementations, such automatic archival may be enabled for one or more particular archiving categories, e.g., if the precision is acceptably high for those particular archiving categories (e.g., based on prior categorizations and labels determined for images). Different categories may have different precision characteristics.

In some implementations, a user can enable or disable the selection of images for archiving and/or can configure the archiving criteria, categories, and thresholds. The method continues to block 312.

In block 312, in some implementations, a recommendation or suggestion to archive the selected images is presented. In some examples, a user interface is displayed to present the suggestion, e.g., an archive suggestion card in a graphical user interface is surfaced or displayed on a device that includes the suggested images to archive (e.g., as part of an assistant application, when an image display or editing application is opened, at a given time interval, etc.). In some examples, the suggested images can be represented by thumbnail images, titles, filenames, etc. In some implementations, a suggestion chip element (user interface graphical element) is displayed in a user interface, e.g., on or near a single image being viewed in the user interface in an image viewing/editing interface, camera application, etc. The chip can include text asking whether the user wishes to archive that single image. In other examples, the suggestion ship can be displayed within a user interface element (e.g., a button, text field, etc.) and/or in a particular location within the user interface, e.g., the perimeter or center of the user interface, etc., where the suggestion chip element can display a representation of one or more of the suggested images (e.g., thumbnails), filenames or titles of the suggested images, etc. to archive.

In some implementations, the suggested images are presented in a particular order, e.g., an order based on their functional image scores, category confidence scores, or other scores or ranking. In some examples, a particular number of the selected images (e.g., the top 5, the top 10, or a top percentage) can be presented in the user interface, and the other selected images can be hidden until presented in response to user input instructing such presentation. In some implementations, the presented suggested images meet an elapsed time period criterion that may be different than the elapsed time period criterion used to select the images in block 310. In some implementations, the archive suggestion can include a display of the one or more determined functional image categories in which the selected images belong. In some examples, a single category can be displayed, e.g., the category to which the greatest number of selected images belong. In some of these implementations, selected images that are not included in this category are not displayed as suggested images (e.g., a different functional image category can be displayed after user input is received, showing remaining selected images as suggestions that are included in that category). In some implementations, the recommendation can include a reason that the suggestion card element is being displayed for a given image where the reason is based on functional labels for the given image and/or the functional image categories of the given image. For example, the suggestion card can include text such as "clean up your photo library by archiving photos of business cards" as a reason for suggesting archival.

In some implementations, the archive suggestions are presented as a default. In some implementations, the archive suggestions are not presented in block 312 and the selected images are designated for automatic archival without user input if particular criteria are met. In some examples, a first archiving threshold can be at a higher requirement level (e.g., a higher value) than a second archiving threshold. An image can be designated for automatic archival without providing the archive suggestions (and without receiving user input) if the functional image score of the image (or category confidence score for the archiving category of the image) meets the first archiving threshold. If the functional image score of the image (or category confidence score for the archiving category of the image) meets the second archiving threshold, and does not meet the first archiving threshold, the selected images are presented as archiving suggestions and user input is requested to accept, reject, and/or delay the suggestions. The method continues to block 314.

In block 314, it is determined whether the selected images are to be archived. In some implementations, the selected images are automatically archived, without user input, if the selected images meet the archiving criteria. In implementations which provide archive suggestions to archive the selected images (e.g., as in block 312), the decision to archive can be based on user input received from a user interface that accepts, rejects, and/or delays the archiving suggestion (e.g., where delay input adds a time period before the selected images are again suggested). In some implementations, some of the suggested selected images can be designated to be archived and some can be designated to not be archived (e.g., particular selected images rejected for archival by user input). If the decision is to archive, the method continues to block 316. If not, the method continues to block 318.

In block 316, one or more selected images are archived. Archiving can include adding a respective archive attribute (e.g., label, which can be image metadata) associated with the selected images to be archived, or modifying a respective existing archival attribute (e.g., functional image identifier) associated with the selected images to indicate the images are archived (e.g., setting a metadata flag to an archive state). In some implementations, archiving can include moving the image data of the archived images to be stored in an archive storage space of data storage (e.g., a storage area, a storage device, a class of storage such as long term storage, an archive folder, etc. that is different than the storage used for non-archived images), e.g., to reduce storage space usage on user devices and/or server devices. In some implementations, an image database is updated to include an attribute "archived" for images that have been archived.

In some implementations, images of the user's collection can be examined for archive status prior to or during display of one or more of the images of the collection, e.g., the images are examined for the archival attribute above. If the archival attribute is detected, the associated (archived) images are excluded from being displayed (e.g., not displayed) in views of non-archived images of the image collection. For example, one or more (non-archived) images of the collection other than the archived images are displayed in such views. In some implementations, archived images may be separately viewable or may be viewable with non-archived images under particular conditions (e.g., when a user provides input to select to view archived images). The method continues to block 318.

In block 318, in some implementations, archiving action feedback can be provided to an image archiving model. For example, user decisions to archive or not archive images, as well as determined image content, features, categories, and/or other image characteristics of archived images and non-archived images suggested for archival, can be provided to a machine-learning model to help train or tune the model.

In some implementations, with user permission, the user's selections whether to archive or to not archive images (e.g., in response to recommendations of block 312 and as obtained to perform block 314, or if the user manually archives images) are stored and used to adjust the archiving process described herein, e.g., adjust one or more thresholds or other parameters, add images to a whitelist or blacklist, etc. For example, the frequency or percentage of particular labels and/or categories of images that are selected by the user to be archived can be determined, and/or the frequency or percentage of particular labels and/or categories of images that are selected by the user to not be archived. (The difference of such archiving and non-archiving selections can also be used.) In some examples, if the percentage of archived images having a particular label or category is higher than a threshold or higher than an average percentage, then threshold(s) associated with that label or category can be reduced to allow a greater number of images with that label or category to be suggested for archiving. In some implementations, a machine-learning model can be trained with such user selections, or other model (e.g., statistical model, etc.) can use such frequencies of archiving and non-archiving user selections to determine images to archive using the model (e.g., images having labels with a high frequency of archiving).

In FIG. 3, various blocks (e.g., blocks 302-318) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks. The table can then be used to determine thresholds based on values in the table.

FIG. 4 is a block diagram of an example device 400 which may be used to implement one or more features described herein. In one example, device 400 may be used to implement a client device, e.g., any of client devices 120-126 shown in FIG. 1. Alternatively, device 400 can implement a server device, e.g., server device 104, etc. In some implementations, device 400 may be used to implement a client device, a server device, or a combination of the above. Device 400 can be any suitable computer system, server, or other electronic or hardware device as described above.

One or more methods described herein (e.g., 200 and/or 300) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 400 includes a processor 402, a memory 404, and I/O interface 406. Processor 402 can be one or more processors and/or processing circuits to execute program code and control basic operations of the device 400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 402 may include one or more co-processors that implement neural-network processing. In some implementations, processor 402 may be a processor that processes data to produce probabilistic output, e.g., the output produced by processor 402 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, machine-learning application 430, other applications 412, and application data 414. Other applications 412 may include applications such as a data display engine, web hosting engine, image display engine, notification engine, social networking engine, etc. In some implementations, the machine-learning application 430 and other applications 412 can each include instructions that enable processor 402 to perform functions described herein, e.g., some or all of the methods of FIGS. 2 and/or 3.

The machine-learning application 430 can include one or more named-entity recognition (NER) implementations for which supervised and/or unsupervised learning can be used. The machine learning models can include multi-task learning based models, residual task bidirectional LSTM (long short-term memory) with conditional random fields, statistical NER, etc. Other applications 412 can include, e.g., functional image detection, functional image archiving suggestion, automatic functional image archiving, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 430 may utilize Bayesian classifiers, support vector machines, neural networks, or other learning techniques. In some implementations, machine-learning application 430 may include a trained model 434, an inference engine 436, and data 432. In some implementations, data 432 may include training data, e.g., data used to generate trained model 434. For example, training data may include any type of data suitable for training a model for functional image detection and archiving, such as images, labels, thresholds, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 434, training data may include such user data. In implementations where users permit use of their respective user data, data 432 may include permitted data.

In some implementations, data 432 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 430 excludes data 432. For example, in these implementations, the trained model 434 may be generated, e.g., on a different device, and be provided as part of machine-learning application 430. In various implementations, the trained model 434 may be provided as a data file that includes a model structure or form, and associated weights. Inference engine 436 may read the data file for trained model 434 and implement a neural network with node connectivity, layers, and weights based on the model structure or form specified in trained model 434.

Machine-learning application 430 also includes a trained model 434. In some implementations, the trained model 434 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 432 or application data 414. Such data can include, for example, images, e.g., when the trained model is used for functional image archiving. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, an indication that an image is functional, etc. depending on the specific trained model. In some implementations, model form or structure also specifies a number and/or type of nodes in each layer.

In different implementations, the trained model 434 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 434 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 432, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to identify image labels that are associated with functional images and/or select thresholds for functional image archiving recommendation.

In another example, a model trained using unsupervised learning may cluster words based on the use of the words in data sources. In some implementations, unsupervised learning may be used to produce knowledge representations, e.g., that may be used by machine-learning application 430. In various implementations, a trained model includes a set of weights, or embeddings, corresponding to the model structure. In implementations where data 432 is omitted, machine-learning application 430 may include trained model 434 that is based on prior training, e.g., by a developer of the machine-learning application 430, by a third-party, etc. In some implementations, trained model 434 may include a set of weights that are fixed, e.g., downloaded from a server that provides the weights.

Machine-learning application 430 also includes an inference engine 436. Inference engine 436 is configured to apply the trained model 434 to data, such as application data 414, to provide an inference. In some implementations, inference engine 436 may include software code to be executed by processor 402. In some implementations, inference engine 436 may specify circuit configuration (e.g., for a programmable processor, for a field programmable gate array (FPGA), etc.) enabling processor 402 to apply the trained model. In some implementations, inference engine 436 may include software instructions, hardware instructions, or a combination. In some implementations, inference engine 436 may offer an application programming interface (API) that can be used by operating system 408 and/or other applications 412 to invoke inference engine 436, e.g., to apply trained model 434 to application data 414 to generate an inference.

Machine-learning application 430 may provide several technical advantages. For example, when trained model 434 is generated based on unsupervised learning, trained model 434 can be applied by inference engine 436 to produce knowledge representations (e.g., numeric representations) from input data, e.g., application data 414. For example, a model trained for functional image archiving may produce functional image labels and confidences for an image, a model trained for suggesting functional image archiving may produce a suggestion for one or more functional images to be archived, or a model for automatic archiving may automatically archive certain functional images based on image type, etc. In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 436.

In some implementations, knowledge representations generated by machine-learning application 430 may be provided to a different device that conducts further processing, e.g., over a network. In such implementations, providing the knowledge representations rather than the images may provide a technical benefit, e.g., enable faster data transmission with reduced cost. In another example, a model trained for functional image archiving may produce a functional image signal for one or more images being processed by the model.

In some implementations, machine-learning application 430 may be implemented in an offline manner. In these implementations, trained model 434 may be generated in a first stage, and provided as part of machine-learning application 430. In some implementations, machine-learning application 430 may be implemented in an online manner. For example, in such implementations, an application that invokes machine-learning application 430 (e.g., operating system 408, one or more of other applications 412) may utilize an inference produced by machine-learning application 430, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 434, e.g., to update embeddings for trained model 434.

In some implementations, machine-learning application 430 may be implemented in a manner that can adapt to particular configuration of device 400 on which the machine-learning application 430 is executed. For example, machine-learning application 430 may determine a computational graph that utilizes available computational resources, e.g., processor 402. For example, if machine-learning application 430 is implemented as a distributed application on multiple devices, machine-learning application 430 may determine computations to be carried out on individual devices in a manner that optimizes computation. In another example, machine-learning application 430 may determine that processor 402 includes a GPU with a particular number of GPU cores (e.g., 1000) and implement the inference engine accordingly (e.g., as 1000 individual processes or threads).

In some implementations, machine-learning application 430 may implement an ensemble of trained models. For example, trained model 434 may include a plurality of trained models that are each applicable to same input data. In these implementations, machine-learning application 430 may choose a particular trained model, e.g., based on available computational resources, success rate with prior inferences, etc. In some implementations, machine-learning application 430 may execute inference engine 436 such that a plurality of trained models is applied. In these implementations, machine-learning application 430 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 408 or one or more other applications 412.

In different implementations, machine-learning application 430 can produce different types of outputs. For example, machine-learning application 430 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 430 may produce an output video with a particular effect applied, e.g., rendered in a comic-book or particular artist's style, when trained model 434 is trained using training data from the comic book or particular artist, etc. In some implementations, machine-learning application 430 may produce an output based on a format specified by an invoking application, e.g. operating system 408 or one or more other applications 412. In some implementations, an invoking application may be another machine-learning application. For example, such configurations may be used in generative adversarial networks, where an invoking machine-learning application is trained using output from machine-learning application 430 and vice-versa.

Any of software in memory 404 can alternatively be stored on any other suitable storage location or computer-readable medium. In addition, memory 404 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. Interfaced devices can be included as part of the device 400 or can be separate and communicate with the device 400. For example, network communication devices, storage devices (e.g., memory and/or database 106), and input/output devices can communicate via I/O interface 406. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 406 can include one or more display devices 420 and one or more data stores 438 (as discussed above). The display devices 420 that can be used to display content, e.g., a user interface of an output application as described herein. Display device 420 can be connected to device 400 via local connections (e.g., display bus) and/or via networked connections and can be any suitable display device. Display device 420 can include any suitable display device such as an LCD, LED, or plasma display screen, CRT, television, monitor, touchscreen, 3-D display screen, or other visual display device. For example, display device 420 can be a flat display screen provided on a mobile device, multiple display screens provided in a goggles or headset device, or a monitor screen for a computer device.

The I/O interface 406 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 4 shows one block for each of processor 402, memory 404, I/O interface 406, and software blocks 408, 412, and 430. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While some components are described as performing blocks and operations as described in some implementations herein, any suitable component or combination of components of environment 100, device 400, similar systems, or any suitable processor or processors associated with such a system, may perform the blocks and operations described.

In some implementations, logistic regression can be used for personalization (e.g., personalizing functional image archiving suggestions based on a user's pattern of archiving activity). In some implementations, the prediction model can be handcrafted including hand selected functional labels and thresholds. The mapping (or calibration) from image content analysis space to a predicted precision within the functional image archiving space can be performed using a piecewise linear model.

In some implementations, the functional image archiving system could include a machine-learning model (as described herein) for tuning the system (e.g., selecting functional image labels and corresponding thresholds) to potentially provide improved accuracy. Inputs to the machine learning model can include image content analysis labels, and/or an image descriptor vector that describes appearance and includes semantic information about an image, where two images with similar feature vectors tend to look the same. Example machine-learning model input can include labels for a simple implementation and can be augmented with image descriptor vector features for a more advanced implementation. Output of the machine-learning module can include a prediction of how likely a user is to want to archive an image should a suggestion to archive the image be surfaced.

Figure 5:
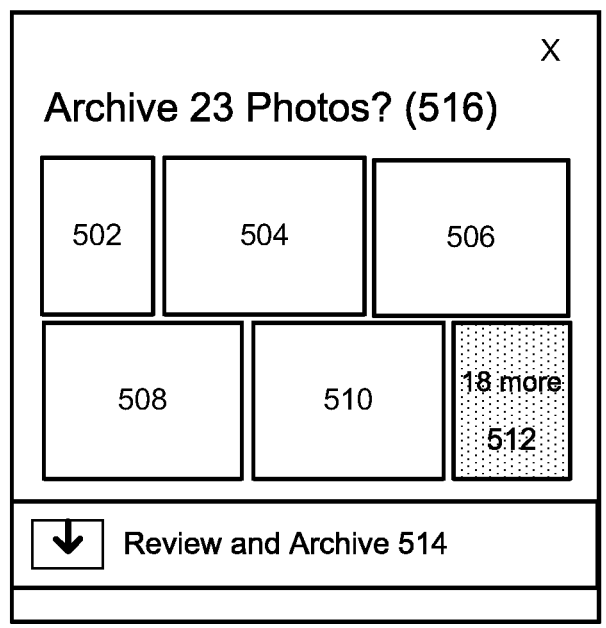
FIG. 5 is a diagrammatic illustration of an example of user interface to provide a suggestion to archive one or more images, according to some implementations.

FIG. 5 is a diagrammatic illustration of an example of user interface 500 to provide a functional image archiving suggestion for one or more images, according to some implementations. User interface 500 can include a suggestion "card" or window that includes a display of thumbnail images (502, 504, 506, 508, and 510) and an element (512) representing suggested images not shown in the thumbnails. For example, images 502-510 may be thumbnail images corresponding to a plurality of images that are identified as functional images, where a functional image is determined as described herein. For example, thumbnail images 502-510 can be lower-resolution versions of higher-resolution images. While FIG. 5 shows five images 502-510, in various implementations, any number of images may be included in user interface 500. In some implementations, e.g., implementations that do not include an image preview, thumbnail images 502-510 may not be included in user interface 500. In some implementations, information about the images, e.g., content labels (e.g., describing people or objects depicted), timestamp, location, etc. may be displayed in addition to or alternative to thumbnails 502-510.

User interface 500 further includes text 516 ("Archive 23 Photos?", in this example) In some implementations, one or more of the images (e.g., images 502-510) may be top ranked functional image(s) (e.g., as described above with reference to FIGS. 2 and 3) and one or more portions of text 516 may be based on the identified functional images. For example, text 516 can include a description of one or more functional image categories in which all (or a portion of) the suggested images are members, and/or a type of image that is suggested to be archived. In some examples for functional image categories, text 516 can include, "Archive these receipts?", "Archive these documents?", etc. In some implementations, when users consent to use of image data, text 516 may include one or more additional portions that are based on image data associated with one or more of the plurality of images (e.g., images 502-510), such as image metadata. For example, the additional portions can indicate location of capture, timestamp, etc. For example, text 516 can include a date of capture or related description to date of capture (e.g., "from yesterday"). In some implementations, text 516 may include default text, e.g., "Archive n images?", and not include portions based on the plurality of images.

The user interface 500 can be receptive to user input that indicates to maintain non-archived status, or to unarchive, the suggested images. In some examples on a client device, handling user actions with respect to the user interface 500 (e.g., archive suggestion card) can include receiving user taps or other input on a dismiss button (not shown) or receiving a touch gesture (e.g., swipe right) to dismiss, and responding by removing the user interface 500 from the display and marking that set of images (e.g., that suggestion card) internally to not be displayed again in further suggestions to archive images.

In some implementations, after a user taps (or selects) an image or the "Review and Archive" button 514 to reveal review page containing the first set of archive suggestions, the system can iterate through the suggested images, e.g., display one suggested image at a time in a sequence. When a user taps on the "More suggestions" button 512, the system can show one or more of the remaining images suggested for archiving that are not displayed in FIG. 5 (e.g., display an amount of images appropriate for the display format, size of interface, etc.).

In some examples, when a user selects to archive the suggested images indicated in the user interface 500 (e.g., taps a displayed archive button or inputs a particular gesture on a touchscreen), the system displays that the images in the set in user interface 500 are archived and the suggestion interface 500 is dismissed and removed from the display. When a user makes a selection of one or more suggested images in the user interface 500 and selects to archive the selected images (e.g., taps a displayed archive button or inputs a particular gesture on a touchscreen), the system displays that the selected images are archived and the suggestion interface 500 is dismissed and removed from the display.

Image archiving suggestion cards can be populated with suggested images for archiving in response to the client requesting the card from a notification system, such that the notification system renders the card. In some implementations, before a user provides user input to select the image archiving suggestion card to reveal the suggestions in the review page, one or more images may have been deleted from the image collection or archived, or new suggestions may have been inserted via an upload by the user. Rather than modifying various handlers to directly edit the card whenever suggestions appear and disappear, a functional image identifier associated with one or more image(s) can be modified instead (e.g., where the functional image identifier can include functional image category, image type, and/or confidence score value). Upon refreshing the user interface, the archiving suggestion card's new set of suggestions is also modified based on the updated functional image identifier.

Providing an identifier specifying functional image category, type, and/or confidence score value for an image enables a functional image archiving suggestion system to fetch images by threshold confidence score without a need to create other data structures, which may be limited in total number that can exist at one time in some implementations. In some implementations, a functional image archiving system can tune the threshold confidence score for archive suggestions to permit adjustments to be made without requiring a retroactive process to reassign images as suggestions.

In some implementations, images suggested for archiving can include an associated suggestion state. The suggestion state can include states of pending, accepted, or rejected. Suggestion state can transition from pending to either accepted or rejected when a user takes action on the suggested image (e.g., accept or reject archival status for the suggested image). In some implementations, when pending suggestions are acted upon by the user, the functional image identifier of the image can be deleted. In some examples, if a user archives the image in any way, the suggestion to archive for the image is considered accepted. If the user does not archive an image per suggestion from an assistant card and subsequent review page, the suggestion to archive for the image can be considered rejected.

Some implementations can include automatic unarchiving of an archived image based one or more parameters or events, e.g., in response to unarchiving criteria being met. Unarchiving criteria for an archived image can include a period of time having elapsed since the image was archived, the image being included in one or more particular functional image categories, the image depicting one or more particular content features or types of content features (e.g. receipts, etc.), the image having a functional image score below a particular threshold, etc.

In some implementations, unarchiving an image can include displaying or surfacing one or more archived images as a notification, e.g., on a displayed card or highlighting the images in a displayed view of images. In some implementations, a prompt for user input can be displayed with the notification, requesting the user to accept or reject unarchiving of any of the archived image(s).

In an example of an image archiving system performing an unarchive operation, an archived image of a receipt may be surfaced (e.g., displayed) within a graphical user interface after a given time period (e.g., 2 months, one year, etc.) as a reminder to extend a warranty, return an item, etc. In another example, an archived photo of a concert advertisement may be surfaced when a user next accesses a ticket purchase app or web site. In yet another example, an archived photo of a product (e.g., "bottle of wine") can be surfaced when the user and device is next located in a store that sells that type of product, etc. In still another example, an archived video of a birthday celebration can be surfaced the following year on the same date it was captured the previous year. In still another example, an archived video of hurricane damage to a structure can be surfaced when a user is detected to be writing an email to the insurer of the structure, as detected by the system if user consent has been obtained.

In some implementations, a functional image archiving system can have a delay period (e.g., 7 days) prior to adding a functional image to a suggestion interface such as the archiving suggestion card. The delay period can be measured from the time of accessibility (e.g., upload or capture) of the image. In some implementations, a list of suggested images to archive can be stored and/or the dates/times when those suggested images are to be surfaced for the user can be stored. In some examples, the list of suggested images can include a particular amount of images (e.g., up to 120 images in descending functional image score order). In some implementations, functional image archive suggestion cards can be presented once per a given time period, e.g., a given time period is provided between display of archive suggestion cards (e.g., once every 20 days if the user has uploaded an image that has an archive suggestion within that time period). The time period can be specified by the user in some implementations.

In some implementations, the given time period between suggestion cards can be adjusted based on the user's acceptance or rejection (dismissal) of one or more prior archiving suggestions. For example, if a user dismisses (e.g., rejects or delays acting on) a functional image archive suggestion card that was displayed after a first time period (e.g., 20 days) since the previous suggestion card, then the next functional image archive suggestion card can be designated to show up after a second, longer time period (e.g., 30 days) than the first time period. If a user accepts one or more suggestions to archive a functional image, the next functional image archive suggestion card may be surfaced sooner (e.g., after a time period of 5 days) than the previous time period between presentation of functional image archive suggestion cards.

Some implementations can be implemented as part of a hardware system (e.g., servers, scanners, cameras, etc.) and/or as part of a software system (e.g., image management application, photo application, data storage application, image recognition application, assistive camera application, etc.). Some implementations can use the signals and scores described herein (e.g., functional image signal, functional image score, etc.) to determine a display status of images in any display context, e.g., when displaying images in any interface or application, e.g., without performing archive actions or providing archive options to the user. For example, a system can use these signals and scores to determine that particular functional images should not be displayed with other images.

One or more methods described herein (e.g., method 200 or 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Due to the nature of generating a functional image archiving suggestion based on analysis of images, implementations discussed herein may require access to user data such as images and current, historical or future archiving actions of relevant users. In situations in which certain implementations discussed herein may collect or use personal information about users (e.g., user data, user image data, image sharing data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed (e.g., the sharing suggestion system may anonymously identify important people by features other than personally identifiable information such as name or user name). As one example, a user's identity may be treated so that no personally identifiable information can be determined. As another example, a user's geographic location or a location associated with user images may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method comprising:
   accessing a plurality of images;
   determining one or more functional labels corresponding to each of the plurality of images and one or more confidence scores corresponding to the one or more functional labels;
   determining a functional image score for each of the plurality of images based on the one or more functional labels having a corresponding confidence score that meets a respective threshold for the one or more functional labels;
   in response to determining that the functional image score meets a functional image score threshold, providing a functional image signal that indicates that one or more of the plurality of images that meet the functional image score threshold are one or more functional images;
   determining that the one or more functional images are to be archived; and
   causing the one or more functional images to be archived by associating an archive attribute with the one or more functional images such that the one or more functional images having the archive attribute are excluded from display in views of the plurality of images.

2. The computer-implemented method of claim 1, further comprising determining whether one or more images of the plurality of images are included in one or more functional image categories.

3. The computer-implemented method of claim 2, wherein determining that the one or more functional images are to be archived is further based on determining that the one or more functional images are included in at least one of the one or more functional image categories.

4. The computer-implemented method of claim 2, wherein determining that the one or more functional images are to be archived is performed automatically when the one or more functional image categories correspond to predetermined archiving categories and the functional image score meets a respective archiving threshold for the one or more functional image categories.

5. The computer-implemented method of claim 2, wherein the one or more functional image categories include at least one of: receipt, document, newspaper, note, product label, screenshot, restaurant menu, identification, or business card.

6. The computer-implemented method of claim 1, wherein determining the one or more functional labels corresponding to each of the plurality of images and the one or more confidence scores corresponding to the one or more functional labels includes:
   programmatically analyzing one or more pixels of each of the plurality of images to detect content of the respective images;
   identifying one or more labels corresponding to each of the plurality of images based on the content of the respective images;
   determining whether the one or more functional labels are present within the one or more labels; and if the one or more functional labels are present, selecting the one or more functional labels and the one or more corresponding confidence scores to associate with one or more of the plurality of images.

7. The computer-implemented method of claim 6, wherein determining whether the one or more functional labels are present within the one or more labels includes determining whether the one or more functional labels match predetermined labels associated with a functional image designation.

8. The computer-implemented method of claim 1, further comprising:
   determining a recommendation to archive the one or more functional images, wherein the recommendation is based on respective functional image scores; and
   causing output of the recommendation by a device, wherein determining that the one or more functional images are to be archived is based on user input received at the device in response to the providing the recommendation.

9. The computer-implemented method of claim 8, wherein causing the output of the recommendation includes displaying a user interface card and a visual representation of at least a subset of the one or more functional images.

10. The computer-implemented method of claim 8, wherein the recommendation includes at least one category associated with at least one of the one or more functional images, wherein the at least one category is based on the one or more functional labels for the one or more functional images.

11. The computer-implemented method of claim 8, wherein the recommendation is provided by surfacing a suggestion chip element in a user interface that displays the plurality of images.

12. The computer-implemented method of claim 1, wherein the method is performed at one of:
   a time the plurality of images is obtained; or
   a time after a time period elapses after the plurality of images was obtained.

13. The computer-implemented method of claim 1, wherein determining the functional image score includes programmatically analyzing one or more of: image content data associated with one or more of the plurality of images or metadata associated with the one or more of the plurality of images.

14. The computer-implemented method of claim 1, further comprising automatically unarchiving at least one of the one or more archived functional images in response to one or more unarchiving criteria being met.

15. A system comprising:
   a memory; and
   at least one processor configured to access the memory and configured to perform operations comprising:
   accessing an image of a plurality of images;
   determining one or more functional labels corresponding to the image and one or more confidence scores corresponding to the one or more functional labels;
   determining a functional image category for the image and a functional image score for the image based on the one or more functional labels having a corresponding confidence score that meets a respective threshold for the one or more functional labels;
   in response to determining that the functional image score meets a functional image score threshold, providing a functional image signal that indicates the image is a functional image;
   generating an identifier associated with the image based on the functional image signal, wherein the identifier includes the functional image category; and
   archiving the image in response to the functional image category being an archiving category and the functional image score meeting an archiving threshold, the archiving causing the image to be excluded from display in views of the plurality of images.

16. The system of claim 15, wherein the at least one processor is further configured to perform operations comprising determining and causing output of a recommendation to archive the functional image based on the functional image score, wherein the operation of archiving the image is in response to user input received in response to the providing the recommendation.

17. The system of claim 15, wherein the operation of determining the one or more functional labels corresponding to the image and the one or more confidence scores corresponding to the one or more functional labels includes determining whether the one or more functional labels match predetermined labels associated with a functional image designation.

18. A non-transitory computer readable medium having stored thereon software instructions that, when executed by a processor, cause the processor to performing operations comprising:
   accessing a plurality of images;
   determining one or more functional labels corresponding to each of the plurality of images and one or more confidence scores corresponding to the one or more functional labels;
   determining a functional image score for each of the plurality of images based on the one or more functional labels having a corresponding confidence score that meets a respective threshold for the one or more functional labels;
   in response to determining that the functional image score meets a functional image score threshold, providing a functional image signal that indicates that one or more of the plurality of images that meet the functional image score threshold are one or more functional images;
   determining whether one or more images of the plurality of images are included in one or more functional image categories;
   in response to determining that the one or more images of the plurality of images are included in the one or more functional image categories, determining that the one or more functional images are to be archived; and
   causing the one or more functional images to be archived by associating an archive attribute with the one or more functional images such that the one or more functional images having the archive attribute are excluded from display in views of the plurality of images.

19. The non-transitory computer readable medium of claim 18, wherein the operation of determining the one or more functional labels corresponding to each of the plurality of images and the one or more confidence scores corresponding to the one or more functional labels includes:
   programmatically analyzing one or more pixels of each of the plurality of images to detect content of the respective images;
   identifying one or more labels corresponding to each of the plurality of images based on the content of the respective images;
   determining whether the one or more functional labels are present within the one or more labels; and if the one or more functional labels are present, selecting the one or more functional labels and the one or more corresponding confidence scores to associate with one or more particular images of the plurality of images.

20. The non-transitory computer readable medium of claim 18, further comprising operations of:
determining a recommendation to archive the one or more functional images based on respective functional image scores; and
causing output of the recommendation by a device,
wherein determining that the one or more functional images are to be archived is based on user input received at the device in response to the providing the recommendation.

* * * * *